United States Patent
Dalmatov

(10) Patent No.: US 10,324,633 B2
(45) Date of Patent: *Jun. 18, 2019

(54) MANAGING SSD WRITE QUOTAS IN DATA STORAGE SYSTEMS

(71) Applicant: EMC IP Holding Company LLC, Hopkinton, MA (US)

(72) Inventor: Nickolay A. Dalmatov, Saint Petersburg (RU)

(73) Assignee: EMC IP Holding Company LLC, Hopkinton, MA (US)

( * ) Notice: Subject to any disclaimer, the term of this patent is extended or adjusted under 35 U.S.C. 154(b) by 252 days.

This patent is subject to a terminal disclaimer.

(21) Appl. No.: 15/334,880

(22) Filed: Oct. 26, 2016

(65) Prior Publication Data

US 2017/0285972 A1    Oct. 5, 2017

(30) Foreign Application Priority Data

Mar. 31, 2016  (RU) .............................. 2016112133

(51) Int. Cl.
*G06F 3/06* (2006.01)

(52) U.S. Cl.
CPC .......... *G06F 3/0616* (2013.01); *G06F 3/0631* (2013.01); *G06F 3/0653* (2013.01); *G06F 3/0659* (2013.01); *G06F 3/0688* (2013.01); *G06F 2212/7208* (2013.01)

(58) Field of Classification Search
CPC .... G06F 3/0616; G06F 3/0688; G06F 3/0653; G06F 3/064
See application file for complete search history.

(56) References Cited

U.S. PATENT DOCUMENTS 7,315,917 B2*  1/2008  Bennett ............... G06F 12/0246
                                                    711/100
2009/0300277 A1* 12/2009  Jeddeloh ............. G06F 12/0246
                                                    711/104

OTHER PUBLICATIONS

Eral Gal, Algorithms and Data Structures for Flash Memories; Jun. 2005, ACM , vol. 37, pp. 138-163.*

* cited by examiner

*Primary Examiner* — Reginald G Bragdon
*Assistant Examiner* — Hannah A Faye
(74) *Attorney, Agent, or Firm* — Krishnendu Gupta; Lesley Leonessa

(57) ABSTRACT

A technique for use in balancing flash drive wear in data storage systems is disclosed. multiple sets of flash drives are identified where data is stored as multiple slices striped across the set of flash drives. A write rate at which data will be written to the multiple slices stored on the set of flash drives during a next time interval is predicted. A number of bytes that can be written to each set of flash drives is determined. A wear metric representative of a wear rate is determined for each set of flash drives. A write quota and an interval period is determined for one or more sets of flash drives. If the wear metric exceeds the write quota for one or more sets of flash drives during the time interval, reduce the wear rate for the one or more sets of flash drives.

7 Claims, 11 Drawing Sheets

MANAGING SSD WRITE QUOTAS IN DATA STORAGE SYSTEMS

TECHNICAL FIELD

The present invention relates to managing solid state drive write quotas in data storage systems.

BACKGROUND OF THE INVENTION

Storage devices are employed to store data that are accessed by computer systems. Examples of basic storage devices include volatile and non-volatile memory, floppy drives, hard disk drives, tape drives, and optical drives. A storage device may be locally attached to an input/output (IO) channel of a computer. For example, a hard disk drive may be connected to a computer's disk controller. A storage device may also be accessible over a network. Examples of such storage devices include network attached storage (NAS) and storage area network (SAN) devices. A storage device may be a single stand-alone component or be comprised of a system of storage devices such as in the case of Redundant Array of Inexpensive Disks (RAID) groups.

A traditional RAID group is a collection of hard disk drives operating together logically as a unified storage device, e.g., to provide some data protection through redundancy. Storage devices with RAID groups are designed to store large quantities of data and typically include one or more storage array processors (SPs), for handling both requests for allocation and IO requests.

Many computing devices now include non-volatile memory (NVM), such as certain magnetic, semiconductor, and/or optical storage media, and may include removable disk systems, hard drives, and other storage media systems allowing the device and/or a user to store data the device uses or is directed to use. The characteristics of non-volatile, vibration-free, small size, and low power consumption have made a type of NVM known as flash memory an excellent component to be utilized in various storage systems.

Flash storage devices are widely used as memory storage for consumer system products such as a notebook, desktop computer, set top box, digital camera, mobile phone, PDA and GPS. The increasing demand for more storage in these products has driven the need to expand the capacity of flash storage devices.

Advances in flash semiconductor technology continue to decrease the cost per unit and increase the capacities of flash devices. Further, flash devices can provide a significant performance advantage over magnetic disk media in many storage system applications. As cost continues to decrease, there is an industry shift underway towards the use of semiconductor solid state drives (also known as solid state disks or SSDs) using flash memory devices as a storage media in storage arrays.

An SSD has many features that can make it an attractive storage device. For example, SSDs have a fast access rate, high throughput, a high integration density, and stability against an external impact. SSDs can move large amounts of data and process a large number of IO requests. This allows users to complete data transactions much more quickly. Thus, in at least some cases, there has been an increasing trend towards the use of SSDs as storage devices instead of, or in addition to, magnetic disks.

However, unlike an HDD employing magnetic disks, SSDs utilizing flash memory devices have a limited number of program/erase (PE) cycles (also referred to as writes or write operations) before the SSD becomes unreliable. The number of PE cycles can vary and SSDs may be categorized based on their number of PE cycles. For example, an SSD may be classified as low endurance (LE), medium endurance (ME) or high endurance (HE) SSD.

SUMMARY OF THE INVENTION

A technique for use in balancing flash drive wear in data storage systems is disclosed. multiple sets of flash drives are identified where data is stored as multiple slices striped across the set of flash drives. A write rate at which data will be written to the multiple slices stored on the set of flash drives during a next time interval is predicted. A number of bytes that can be written to each set of flash drives is determined. A wear metric representative of a wear rate is determined for each set of flash drives. A write quota and an interval period is determined for one or more sets of flash drives. If the wear metric exceeds the write quota for one or more sets of flash drives during the time interval, reduce the wear rate for the one or more sets of flash drives.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION

Figure 1:
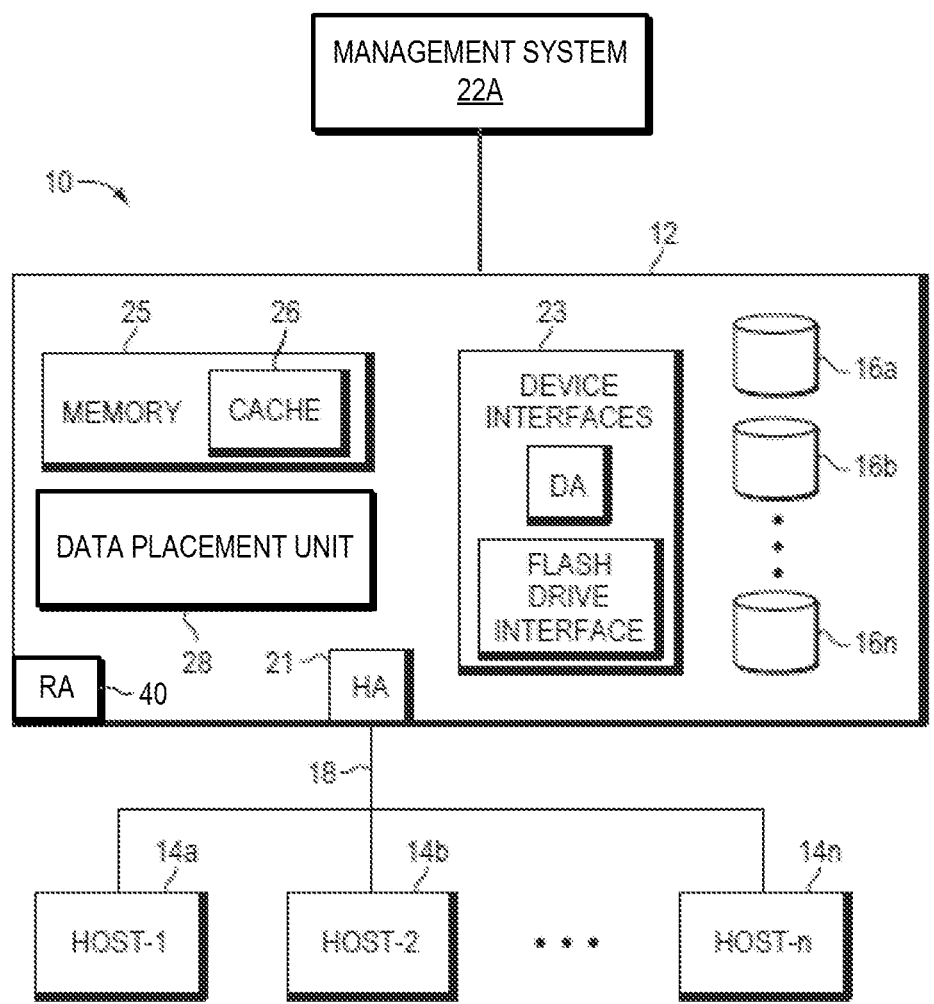
FIG. 1 is an example of a system that may utilize the technique described herein.

Data storage systems may include different types of storage devices, such as solid state drives (SSDs) and hard disk drives. SSDs are typically specified as having an expected lifetime (e.g., as measured in an amount of actual elapsed time such as a number of years or months) based on a number of guaranteed write cycles at a particular rate or frequency at which the writes are performed. Thus, an SSD may have a specified lifetime rating expressed in calendar or wall clock elapsed time based on the amount of time it takes to perform the number of guaranteed write cycles. SSDs comprising flash memory devices may also be referred to herein as flash drives; however the techniques described herein may utilize SSDs that employ other memory technology such as nonvolatile Random Access Memory (NRAM), phase-change RAM (PRAM), ferroelectric RAM (FERAM), magnetoresistive RAM (MRAM), resistance-change RAM (RRAM). and the like.

An SSD may be specified as having a physical size and a logical size. The physical size (also referred to herein as "physical space") or capacity represents the total amount of memory available on the device. The logical size (also referred to herein as "logical space") is the amount memory allocated to a user for storing user data. The remaining amount of space is reserved for data management processes, and may be referred to herein as over-provisioning. For example, physical size may be 256 GB and the logical size may be 200 GB. The remaining 56 GB may be reserved for over-provisioning.

Logical to physical size is typically chosen such that the SSD can meet a particular specification, such as a rated lifetime specification based on an expected rate at which the writes will be performed. The allocation of over-provisioning space to logical space may be expressed as a ratio and varies based on intended application taking into account desired endurance and performance characteristics (as used herein, such ratio may be referred to as "over-provisioning ratio" or "allocation ratio"). For example, over-provisioning values may vary from as low as 2-5% for inexpensive consumer applications to upwards of 60-70% for high-performance MLC flash enterprise applications.

An SSD can be queried to determine the drive's effective write rate. Wear rate may be monitored based upon a particular implementation criteria. For instance, wear rates may be monitored hourly, daily, weekly, or monthly as desired based upon operating demand placed on the system. For example, querying an SSD may indicate that it's been written to 10 K times after one month of operation. If writes continue at the same rate, the SSD will be written to 120 K times per year. After five years, a common warranty period, the SSD will be written to 600 K times. If the SSD is warranted for say 500 K writes, the SSD can be expected to fail in less than 5 years which would be within the warranty period, resulting in increased maintenance costs and a dissatisfied customer.

Advantageously, techniques described herein disclose a method to estimate the rate at which writes will occur to a particular SSD. The warranty period for the SSD can be determined. The technique further determines if writes at the estimated rate will result in reaching the SSD's end of warranty period before the warranty period expires. If so, data can be moved to drives having a lower write rate. The method may be performed across substantially all a storage array's SSDs such that substantially all the SSDs will wear at the same rate, thereby balancing wear across all the SSDs.

For example, consider the scenario where writes are estimated at say 4 K per month, or 48 K per year. If the SSD drive is rated for 500 K writes over its lifetime, and writes continue at this rate, the drive may last over 10 years. In this case, the amount write activity may be increased, thereby, improving system performance by increasing the rate at which writes are directed to the SSD. However, if writes are estimated to occurs at say 120 K per year, or 600 K in 5 years, the drive may wear out before the end of the 500 K write warranty period. In this case, the write wear rate can be reduces by relocating slices (e.g., write heavy slices) to a different SSD experience a lower write rate.

Consequently, employing techniques described herein may be used to increase and/or decrease the wear rate for multiple SSDs to balance wear across the multiple SSDs and potentially improve system performance. In this case, the technique may be used to monitor the rate at which writes are directed to an SSD and if it is determined that the rate is high enough such that the drive may be expected to fail sooner than expected, logical space can be decreased to slow the number of writes directed to the drive and in create the relative amount of over-provisioning space available for data management and storage operations. As a result, the method will slow the rate at which the SSD wears. If it is determined that the writes are so low such that the expected lifetime of the drive is significantly beyond the intended use, and performance may be improved by increasing the number of writes directed to the SSD. By continuously monitoring the rate, the amount of memory allocated for logical space may be increased or decreased in order to tailor the wear rate so as to ensure the SSD lasts as long as intended while providing maximum performance during its lifetime.

Advantageously, the techniques can allow a data storage system to balance the SSD wear rate by dynamically adjusting the wear rate as workloads change. Such changes may occur over time. For example, workloads may increase when the system is first put into production. As applications and data are loaded onto the system and as the system ramps up, it stores more and more data thereby approaching capacity. In this case, it may be desirable to reduce or slow the rate at which data is written to the system. Alternatively, workloads may decrease as new systems are installed. Applications and data may be moved from one or more existing system onto the new system thereby decreasing workloads on the existing system. As the storage system reaches end-of-life, applications may continue to be migrated elsewhere thus reducing the wear rate and, in this case, memory allocated for capacity may be increased to provide additional performance boost.

Referring to FIG. 1, shown is an example of an embodiment of a system that may be used in connection with performing one or more implementations of the current techniques described herein. The system 10 includes a data storage system 12 connected to host systems 14a-14n through communication medium 18. In this embodiment of the computer system 10, the n hosts 14a-14n may access the data storage system 12, for example, in performing input/output (IO) operations or data requests. The communication medium 18 may be any one or more of a variety of networks or other type of communication connections as known to those skilled in the art. The communication medium 18 may be a network connection, bus, and/or other type of data link, such as a hardwire, wireless, or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n and data storage system may all be located at the same physical site, or, alternatively, may also be located in different physical locations. The communication medium that may be used to provide the different types of connections between the host computer systems and the data storage system of the system 10 may use a variety of different communication protocols such as SCSI, Fibre Channel, PCIe, iSCSI, NFS, and the like. Some or all of the connections by which the hosts and data storage system may be connected to the communication medium may pass through other communication devices, such as a Connectrix or other switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrating the techniques herein, reference may be made to a single data storage array by a vendor, such as by EMC Corporation of Hopkinton, Mass. However, the techniques described herein are applicable for use with other data storage arrays by other vendors and with other components than as described herein for purposes of example.

The data storage system 12 may be a data storage array including a plurality of data storage devices 16a-16n. The data storage devices 16a-16n may include one or more types of data storage devices such as, for example, one or more disk drives and/or one or more solid state drives (SSDs). An SSD is a data storage device that uses solid-state memory to store persistent data. An SSD using SRAM or DRAM, rather than flash memory, may also be referred to as a RAM drive. SSD may refer to solid state electronics devices as distinguished from electromechanical devices, such as hard drives, having moving parts. Flash memory-based SSDs (also referred to herein as "flash disk drives," "flash storage drives", or "flash drives") are one type of SSD that contains no moving mechanical parts.

The flash devices may be constructed using nonvolatile semiconductor NAND flash memory. The flash devices may include one or more SLC (single level cell) devices and/or MLC (multi level cell) devices.

It should be noted that the techniques herein may be used in connection with flash devices comprising what may be characterized as enterprise-grade or enterprise-class SSDs (EFDs) with an expected lifetime (e.g., as measured in an amount of actual elapsed time such as a number of years, months, and/or days) based on a number of guaranteed write cycles, or program cycles, and a rate or frequency at which the writes are performed. Thus, a flash device may be expected to have a usage measured in calendar or wall clock elapsed time based on the amount of time it takes to perform the number of guaranteed write cycles. The techniques herein may also be used with other flash devices, more generally referred to as non-enterprise class flash devices, which, when performing writes at a same rate as for enterprise class drives, may have a lower expected lifetime based on a lower number of guaranteed write cycles.

The techniques herein may be generally used in connection with any type of flash device, or more generally, any SSD technology. The flash device may be, for example, a flash device which is a NAND gate flash device, NOR gate flash device, flash device that uses SLC or MLC technology, and the like, as known in the art. In one embodiment, the one or more flash devices may include MLC flash memory devices although an embodiment may utilize MLC, alone or in combination with, other types of flash memory devices or other suitable memory and data storage technologies. More generally, the techniques herein may be used in connection with other SSD technologies although particular flash memory technologies may be described herein for purposes of illustration. For example, consistent with description elsewhere herein, an embodiment may define multiple storage tiers including one tier of PDs based on a first type of flash-based PDs, such as based on SLC technology, and also including another different tier of PDs based on a second type of flash-based PDs, such as MLC. Generally, the SLC PDs may have a higher write endurance and speed than MLC PDs.

The data storage array may also include different types of adapters or directors, such as an HA 21 (host adapter), RA 40 (remote adapter), and/or device interface 23. Each of the adapters may be implemented using hardware including a processor with local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from the host. The data storage array may include one or more RAs that may be used, for example, to facilitate communications between data storage arrays. The data storage array may also include one or more device interfaces 23 for facilitating data transfers to/from the data storage devices 16a-16n. The data storage interfaces 23 may include device interface modules, for example, one or more disk adapters (DAs) (e.g., disk controllers), adapters used to interface with the flash drives, and the like. The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, HAs and/or RAs in a data storage array. In one embodiment, the device interfaces 23 may perform data operations using a cache that may be included in the global memory 25b, for example, when communicating with other device interfaces and other components of the data storage array. The other portion 25a is that portion of memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment. Furthermore, the data storage devices 16a-16n may be connected to one or more controllers (not shown). The controllers may include storage devices associated with the controllers. Communications between the controllers may be conducted via inter-controller connections. Thus, the current techniques described herein may be implemented in conjunction with data storage devices that can be directly connected or indirectly connected through another controller.

Host systems provide data and access control information through channels to the storage systems, and the storage systems may also provide data to the host systems also through the channels. The host systems do not address the drives or devices 16a-16n of the storage systems directly, but rather access to data may be provided to one or more host systems from what the host systems view as a plurality of logical devices, logical volumes (LVs) which may also referred to herein as logical units (e.g., LUNs). A logical unit (LUN) may be characterized as a disk array or data storage system reference to an amount of disk space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives or more generally physical storage devices. For example, one or more LUNs may reside on a single physical disk drive, data of a single LUN may reside on multiple different physical devices, and the like. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may be one type of device interface used in connection with facilitating data transfers to/from the associated disk drive(s) and LUN (s) residing thereon. A flash device interface may be another type of device interface used in connection with facilitating data transfers to/from the associated flash devices and LUN (s) residing thereon. It should be noted that an embodiment may use the same or a different device interface for one or more different types of devices than as described herein.

In an embodiment in accordance with techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

A map kept by the storage array may associate logical addresses in the host visible LUs with the physical device addresses where the data actually is stored. The map also contains a list of unused slices on the physical devices that are candidates for use when LUs are created or when they expand. The map in some embodiments may also contains other information such as time last access for all or a subset of the slices or frequency counters for the slice; the time last access or frequency counters. This information can be analyzed to derive a temperature of the slices which can indicate the activity level of data at the slice level.

The map, or another similar map, may also be used to store information related to write activity (e.g., erase count) for multiple drives in the storage array. This information can be used to identify drives having high write related wear relative to other drives having a relatively low write related wear.

The device interface, such as a DA, performs I/O operations on a physical device or drive 16a-16n. In the following description, data residing on a LUN may be accessed by the device interface following a data request in connection with I/O operations that other directors originate. The DA which services the particular physical device may perform processing to either read data from, or write data to, the corresponding physical device location for an I/O operation.

Also shown in FIG. 1 is a management system 22a that may be used to manage and monitor the system 12. In one embodiment, the management system 22a may be a computer system which includes data storage system management software such as may execute in a web browser. A data storage system manager may, for example, view information about a current data storage configuration such as LUNs, storage pools, and the like, on a user interface (UI) in display device of the management system 22a.

It should be noted that each of the different adapters, such as HA 21, DA or disk interface, RA, and the like, may be implemented as a hardware component including, for example, one or more processors, one or more forms of memory, and the like. Code may be stored in one or more of the memories of the component for performing processing.

The device interface, such as a DA, performs I/O operations on a physical device or drive 16a-16n. In the following description, data residing on a LUN may be accessed by the device interface following a data request in connection with I/O operations that other directors originate. For example, a host may issue an I/O operation which is received by the HA 21. The I/O operation may identify a target location from which data is read from, or written to, depending on whether the I/O operation is, respectively, a read or a write operation request. The target location of the received I/O operation may be expressed in terms of a LUN and logical address or offset location (e.g., LBA or logical block address) on the LUN. Processing may be performed on the data storage system to further map the target location of the received I/O operation, expressed in terms of a LUN and logical address or offset location on the LUN, to its corresponding physical storage device (PD) and location on the PD. The DA which services the particular PD may further perform processing to either read data from, or write data to, the corresponding physical device location for the I/O operation.

It should be noted that an embodiment of a data storage system may include components having different names from that described herein but which perform functions similar to components as described herein. Additionally, components within a single data storage system, and also between data storage systems, may communicate using any suitable technique that may differ from that as described herein for exemplary purposes. For example, element 12 of FIG. 1 may be a data storage system, such as the VNXe® Data Storage System by EMC Corporation of Hopkinton, Mass., that includes multiple storage processors (SPs). Each of the SPs 27 may be a CPU including one or more "cores" or processors and each may have their own memory used for communication between the different front end and back end components rather than utilize a global memory accessible to all storage processors. In such embodiments, memory 26 may represent memory of each such storage processor.

An embodiment in accordance with techniques herein may have one or more defined storage tiers. Each tier may generally include physical storage devices or drives having one or more attributes associated with a definition for that tier. For example, one embodiment may provide a tier definition based on a set of one or more attributes or properties. The attributes may include any one or more of a storage type or storage technology, device performance characteristic(s), RAID (Redundant Array of Independent Disks) group configuration, storage capacity, and the like. RAID groups are known in the art. The PDs of each RAID group may have a particular RAID level (e.g., RAID-1, RAID-5 3+1, RAID-5 7+1, and the like) providing different levels of data protection. For example, RAID-1 is a group of PDs configured to provide data mirroring where each data portion is mirrored or stored on 2 PDs of the RAID-1 group. The storage type or technology may specify whether a physical storage device is an SSD (solid state drive) drive (such as a flash drive), a particular type of SSD drive (such using flash memory or a form of RAM), a type of rotating magnetic disk or other non-SSD drive (such as a 10K RPM rotating disk drive, a 15K RPM rotating disk drive), and the like.

Performance characteristics may relate to different performance aspects of the physical storage devices of a particular type or technology. For example, there may be multiple types of rotating disk drives based on the RPM characteristics of the disk drives where disk drives having different RPM characteristics may be included in different storage tiers. Storage capacity may specify the amount of data, such as in bytes, that may be stored on the drives. An embodiment may define one or more such storage tiers. For example, an embodiment in accordance with techniques herein that is a multi-tiered storage system may define two storage tiers including a first tier of all SSD drives and a second tier of all non-SSD drives. As another example, an embodiment in accordance with techniques herein that is a multi-tiered storage system may define three storage tiers including a first tier of all SSD drives which are flash drives, a second tier of all 15K RPM rotating disk drives, and a third tier of all 10K RPM rotating disk drives. In terms of general expected performance, the SSD or flash tier may be considered the highest performing tier. The second tier of 15K RPM disk drives may be considered the second or next highest performing tier and the 10K RPM disk drives may be considered the lowest or third ranked tier in terms of expected performance. The foregoing are some examples of tier definitions and other tier definitions may be specified and used in an embodiment in accordance with techniques herein.

Figure 2:
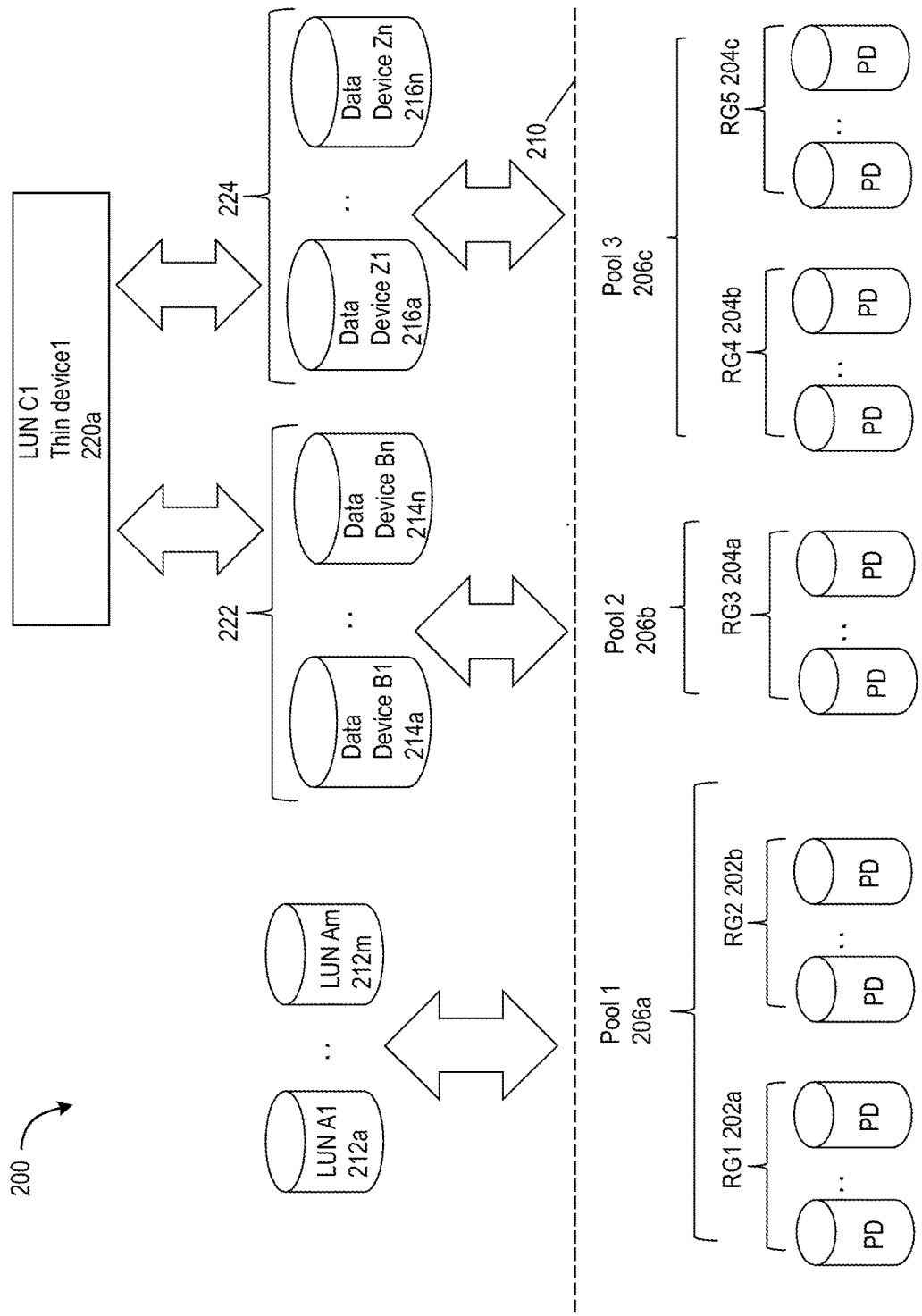
FIG. 2 is an example representation of physical and logical views of entities in connection with storage in an embodiment in accordance with techniques herein.

In a data storage system in an embodiment in accordance with techniques herein, PDs may be configured into a pool or group of physical storage devices where the data storage system may include many such pools of PDs such as illustrated in FIG. 2. Each pool may include one or more configured RAID groups of PDs.

Depending on the particular embodiment, each pool may also include only PDs of the same storage tier with the same type or technology, or may alternatively include PDs of different storage tiers with different types or technologies.

The techniques herein may be generally used in connection with any type of flash device, or more generally, any SSD technology. The flash device may be, for example, a flash device which is a NAND gate flash device, NOR gate flash device, flash device that uses SLC or MLC technology, and the like. In one embodiment, the one or more flash devices may include MLC flash memory devices although an embodiment may utilize MLC, alone or in combination with, other types of flash memory devices or other suitable memory and data storage technologies. More generally, the techniques herein may be used in connection with other SSD technologies although particular flash memory technologies may be described herein for purposes of illustration. For example, consistent with description elsewhere herein, an embodiment may define multiple storage tiers including one tier of PDs based on a first type of flash-based PDs, such as based on SLC technology, and also including another different tier of PDs based on a second type of flash-based PDs, such as MLC. Generally, the SLC PDs may have a higher write endurance and speed than MLC PDs.

With reference to FIG. 2, a first pool, pool 1 206a, may include two RAID groups (RGs) of 10K RPM rotating disk drives of a first storage tier. The foregoing two RGs are denoted as RG1 202a and RG2 202b. A second pool, pool 2 206b, may include 1 RG (denoted RG3 204a) of 15K RPM disk drives of a second storage tier of PDs having a higher relative performance ranking than the first storage tier of 10K RPM drives. A third pool, pool 3 206c, may include 2 RGs (denoted RG 4 204b and RG 5 204c) each of which includes only flash-based drives of a third highest performance storage tier of PDs having a higher relative performance ranking than both the above-noted first storage tier of 10K RPM drives and second storage tier of 15K RPM drives.

The components illustrated in the example 200 below the line 210 may be characterized as providing a physical view of storage in the data storage system and the components illustrated in the example 200 above the line 210 may be characterized as providing a logical view of storage in the data storage system. The pools 206a-c of the physical view of storage may be further configured into one or more logical entities, such as LUNs or more generally, logical devices. For example, LUNs 212a-m may be thick or regular logical devices/LUNs configured or having storage provisioned, from pool 1 206a. LUN 220a may be a virtually provisioned logical device, also referred to as a virtually provisioned LUN, thin device or thin LUN, having physical storage configured from pools 206b and 206c. A thin or virtually provisioned device is described in more detail in following paragraphs and is another type of logical device that may be supported in an embodiment of a data storage system in accordance with techniques herein.

Generally, a data storage system may support one or more different types of logical devices presented as LUNs to clients, such as hosts. For example, a data storage system may provide for configuration of thick or regular LUNs and also virtually provisioned or thin LUNs, as mentioned above. A thick or regular LUN is a logical device that, when configured to have a total usable capacity such as presented to a user for storing data, has all the physical storage provisioned for the total usable capacity. In contrast, a thin or virtually provisioned LUN having a total usable capacity (e.g., a total logical capacity as published or presented to a user) is one where physical storage may be provisioned on demand, for example, as data is written to different portions of the LUN's logical address space. Thus, at any point in time, a thin or virtually provisioned LUN having a total usable capacity may not have an amount of physical storage provisioned for the total usable capacity.

The granularity or the amount of storage provisioned at a time for virtually provisioned LUN may vary with embodiment. In one embodiment, physical storage may be allocated, such as a single allocation unit of storage, the first time there is a write to a particular target logical address (e.g., LUN and location or offset on the LUN). The single allocation unit of physical storage may be larger than the size of the amount of data written and the single allocation unit of physical storage is then mapped to a corresponding portion of the logical address range of a LUN. The corresponding portion of the logical address range includes the target logical address. Thus, at any point in time, not all portions of the logical address space of a virtually provisioned device may be associated or mapped to allocated physical storage depending on which logical addresses of the virtually provisioned LUN have been written to at a point in time.

In one embodiment, a thin device may be implemented as a first logical device, such as 220a, mapped to portions of one or more second logical devices, also referred to as data devices. Each of the data devices may be subsequently mapped to physical storage of underlying storage pools. For example, portions of thin device 220a may be mapped to corresponding portions in one or more data devices of the first group 222 and/or one or more data devices 216a-n of the second group 224. Data devices 214a-n may have physical storage provisioned in a manner like thick or regular LUNs from pool 206b. Data devices 216a-n may have physical storage provisioned in a manner like thick or regular LUNs (e.g., similar to LUNs A1-Am 212a-212m) from pool 206c. Thus, portions of thin device 220a mapped to data devices of 222 have their data stored on 15K RPM PDs of pool 206b, and other portions of thin device 220a mapped to data devices of 224 have their data stored on flash PDs of pool 206c. In this manner, storage for different portions of thin device 220a may be provisioned from multiple storage tiers.

In at least one embodiment as described herein, the particular storage tier upon which a data portion of a thin device is stored may vary with the I/O workload directed to that particular data portion. For example, a first data portion of thin device 220a having a high I/O workload may be stored on a PD of pool 206c by mapping the first logical address of the first data portion in the thin LUN's address space to a second logical address on a data device in 224. In turn the second logical address of the data device in 224 may be mapped to physical storage of pool 206c. A second data portion of thin device 220a having a lower I/O workload than the first data portion may be stored on a PD of pool 206b by mapping the third logical address of the second data portion in the thin LUN's address space to a fourth logical address on a data device in 222. In turn the fourth logical address of the data device in 222 may be mapped to physical storage of pool 206b. As the I/O workload of the foregoing two data portions of thin device 220a may vary, the data portions may be relocated to a different storage tier. For example, if the workload of the second data portion greatly increases at a later point in time, the second data portion may be relocated or moved to pool 206c by mapping its corresponding third logical address in the thin device 220a's address space to a fifth logical address of a data device in 224 where the fifth logical address is mapped to physical storage on pool 206c. The foregoing is described in more detail elsewhere herein.

In some embodiments, the data devices of 222 and 224 may not be directly useable (visible) to hosts coupled to a data storage system. Each of the data devices may correspond to one or more portions (including a whole portion) of one or more of the underlying physical devices. As noted above, the data devices 222 and 224 may be designated as corresponding to different performance classes or storage tiers, so that different ones of the data devices of 222 and 224 correspond to different physical storage having different relative access speeds and/or different RAID protection type (or some other relevant distinguishing characteristic or combination of characteristics), as further discussed elsewhere herein.

Figure 3:
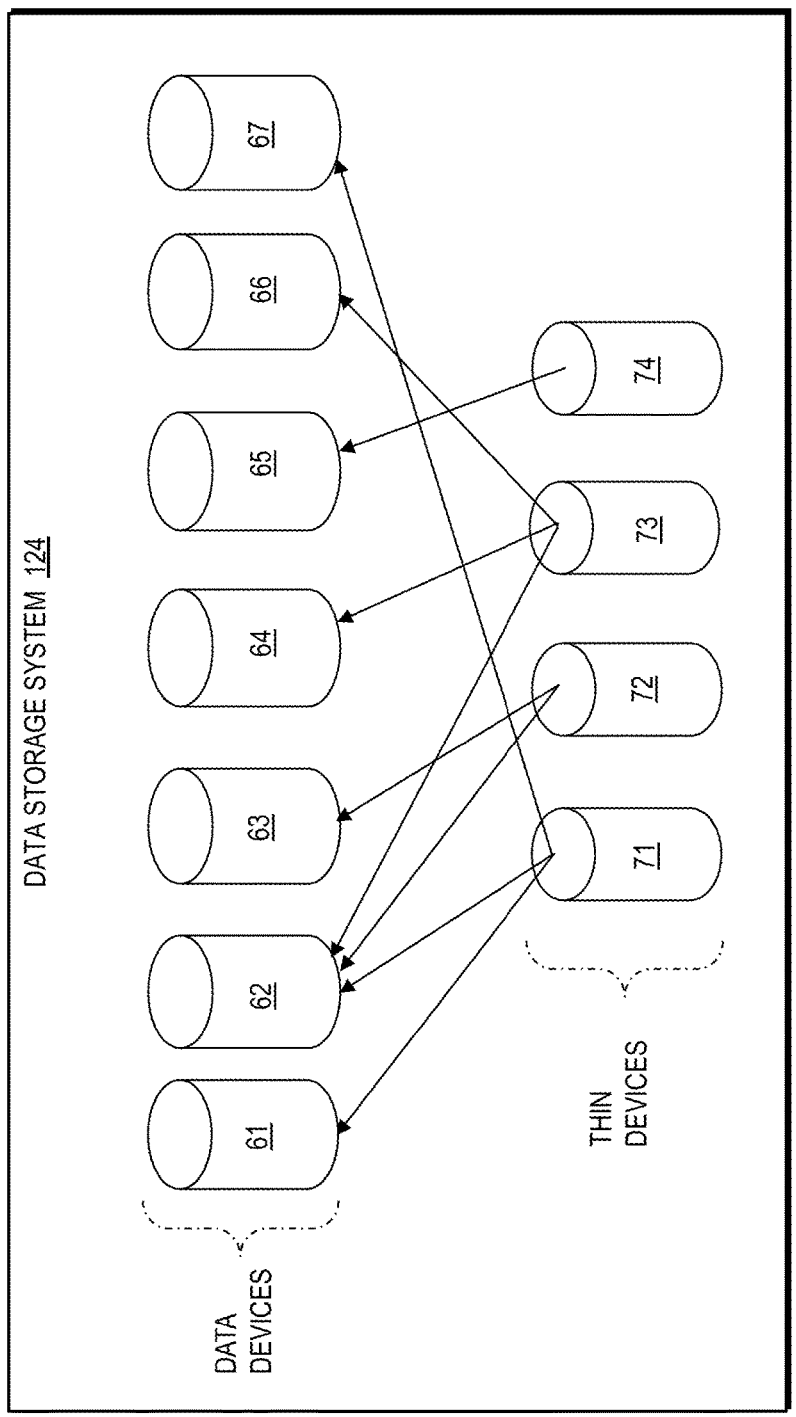
FIGS. 3, 4, and 5 are block diagrams illustrating aspects of implement thin or virtually provisioned logical devices in an embodiment in accordance with techniques herein.

As shown in FIG. 3, the data storage system 124 may also include a plurality of thin devices 71-74 that may be adapted for use in connection with the system described herein when using thin provisioning. Consistent with discussion elsewhere herein, in a system using thin provisioning, the thin devices 71-74 may appear to a host coupled to the storage system 124 as one or more logical volumes (logical devices) containing contiguous blocks of data storage. Each of the thin devices 71-74 may contain pointers to some or all of the data devices 61-67 (or portions thereof). As described in more detail elsewhere herein, a thin device may be virtually provisioned in terms of its allocated physical storage in physical storage for a thin device presented to a host as having a particular capacity is allocated as needed rather than allocate physical storage for the entire thin device capacity upon creation of the thin device. As such, a thin device presented to the host as having a capacity with a corresponding LBA (logical block address) range may have portions of the LBA range for which storage is not allocated.

Figure 4:
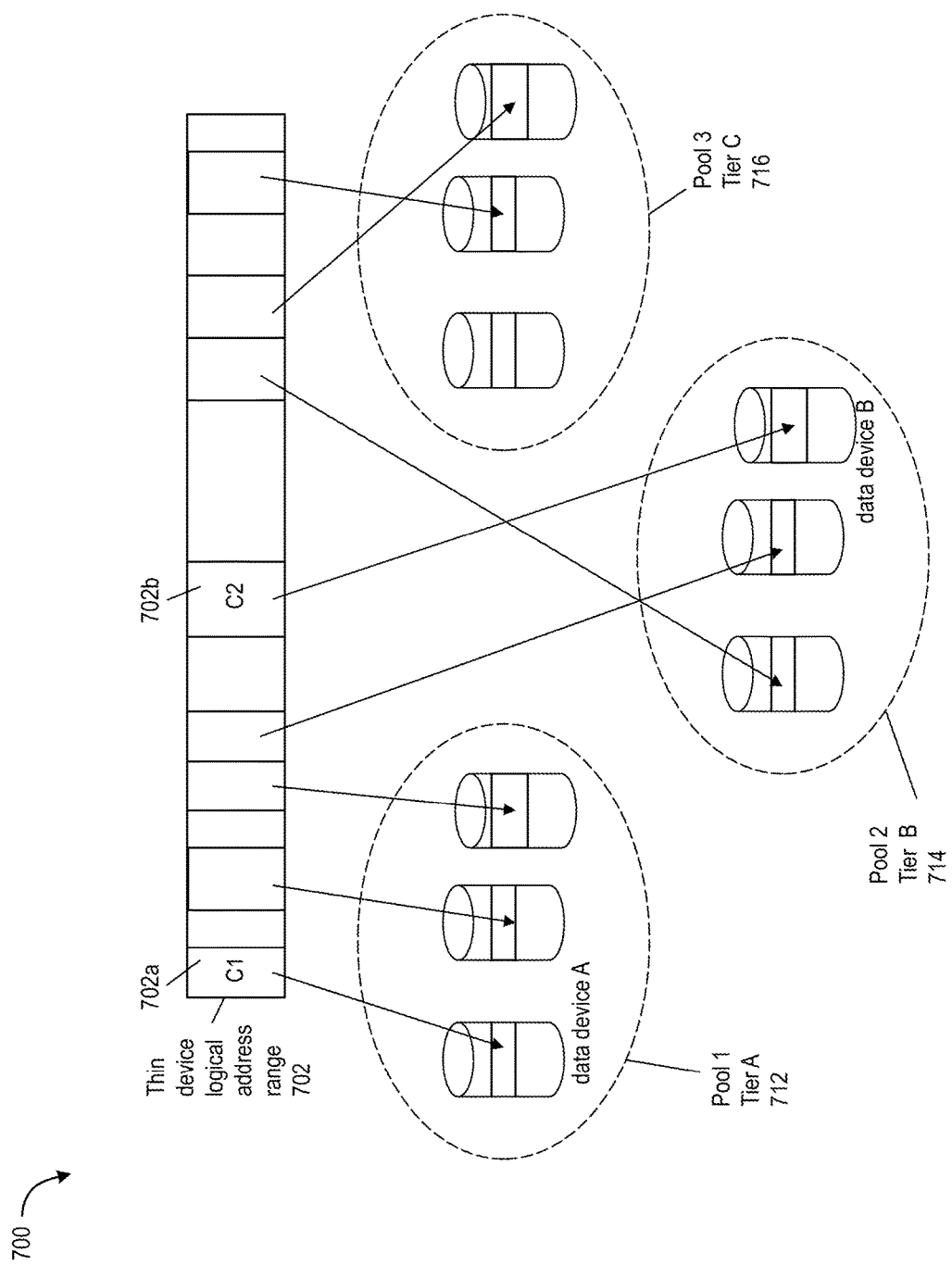

Referring to FIG. 4, shown is an example 700 illustrating use of a thin device in an embodiment in accordance with techniques herein. The example 700 includes three storage pools 712, 714 and 716 with each such pool representing a storage pool of a different storage tier. For example, pool 712 may represent a storage pool of tier A of flash storage devices, pool 714 may represent a storage pool of tier B of 15K RPM storage devices, and pool 716 may represent a storage pool of tier C of 10K RPM storage devices. Each storage pool may include a plurality of logical devices which are data devices mapped to the pool's underlying physical devices (or portions thereof). Element 702 represents the thin device address space or range including chunks which are mapped to different storage pools. For example, element 702a denotes a chunk C1 which is mapped to storage pool 712 and element 702b denotes a chunk C2 which is mapped to storage pool 714. Element 702 may be a representation for a first thin device which is included in a storage group of one or more thin devices.

It should be noted that although the example 700 illustrates only a single storage pool per storage tier, an embodiment may also have multiple storage pools per tier.

Figure 5:
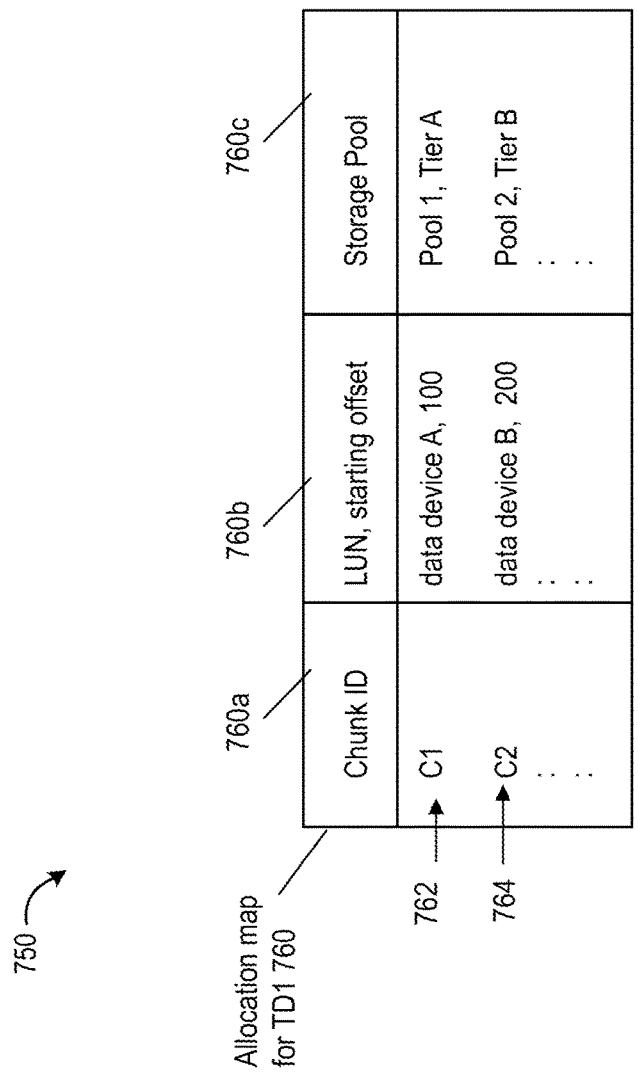

Referring to FIG. 5, shown is an example representation of information that may be included in an allocation map in an embodiment in accordance with techniques herein. An allocation map may be used to identify the mapping for each thin device (TD) chunk (e.g. where each chunk is physically located). Element 760 represents an allocation map that may be maintained for each TD. In this example, element 760 represents information as may be maintained for a single TD although another allocation map may be similarly used and maintained for each other TD in a storage group. Element 760 may represent mapping information as illustrated in FIG. 4 such as in connection the mapping of 702 to different storage pool devices. The allocation map 760 may contain an entry for each chunk and identify which data device and associated physical storage is mapped to the chunk. For each entry or row of the map 760 corresponding to a chunk, a first column 760a, Chunk ID, denotes an identifier to uniquely identify the chunk of the TD, a second column 760b, indicates information about the data device and offset to which the chunk is mapped, and a third column storage pool 760c denotes the storage pool and tier including the data device of 760b. For example, entry 762 represents chunk C1 illustrated in FIG. 4 as 702a and entry 764 represents chunk C2 illustrated in FIG. 4 as 702b. It should be noted that although not illustrated, the allocation map may include or otherwise use other tables and structures which identify a further mapping for each data device such as which physical device locations map to which data devices. This further mapping for each data device is described and illustrated elsewhere herein. Such information as illustrated and described in connection with FIG. 5 may be maintained for each thin device in an embodiment in accordance with techniques herein.

Thin devices and thin provisioning, also referred to respectively as virtually provisioned devices and virtual provisioning, are described in more detail, for example, in U.S. patent application Ser. No. 11/726,831, filed Mar. 23, 2007 (U.S. Patent App. Pub. No. 2009/0070541 A1), entitled AUTOMATED INFORMATION LIFE-CYCLE MANAGEMENT WITH THIN PROVISIONING, and U.S. Pat. No. 7,949,637, Issued May 24, 2011, entitled STORAGE MANAGEMENT FOR FINE GRAINED TIERED STORAGE WITH THIN PROVISIONING, both of which are incorporated by reference herein.

Figure 6:
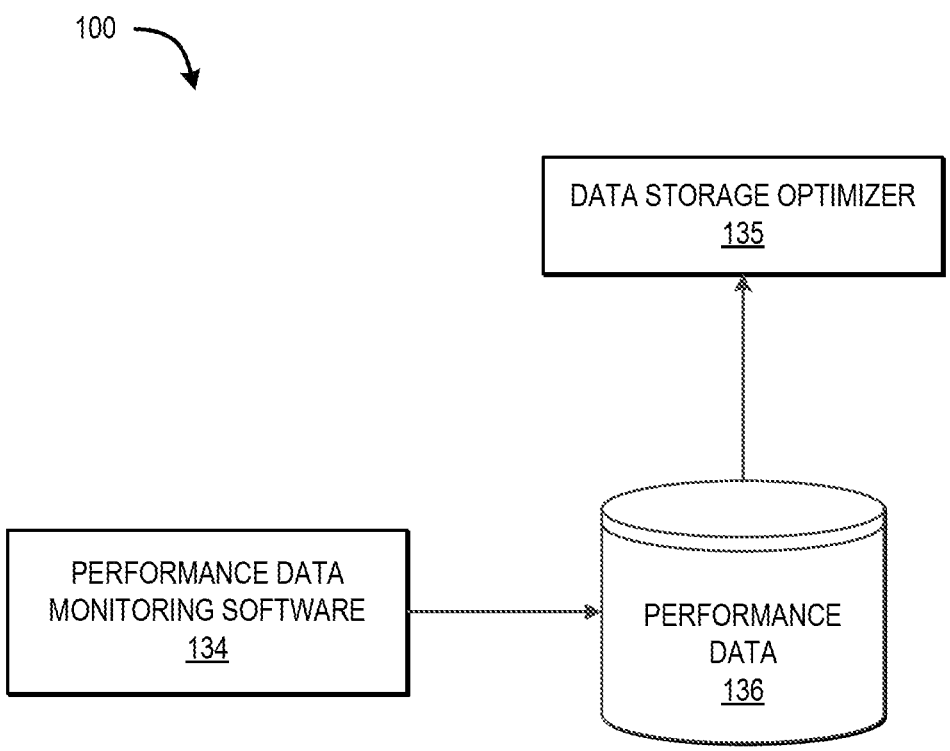
FIG. 6 is an example illustrating data and software components that may be used in an embodiment in accordance with techniques herein.

Referring to FIG. 6, shown is an example 100 of components that may be used in an embodiment in connection with techniques herein. The example 100 includes performance data monitoring software 134 which gathers performance data about the data storage system. The software 134 may gather and store performance data 136. This performance data 136 may also serve as an input to other software, such as used by the data storage optimizer 135 in connection with performing data storage system optimizations, which attempt to enhance the performance of I/O operations, such as those I/O operations associated with data storage devices 16a-16n of the system 12 (as in FIG. 1). For example, the performance data 136 may be used by a data storage optimizer 135 in an embodiment in accordance with techniques herein. The performance data 136 may be used in determining and/or optimizing one or more statistics or metrics such as may be related to, for example, a wear rate for one or more physical devices, a pool or group of physical devices, logical devices or volumes (e.g., LUNs), thin or virtually provisioned devices (described in more detail elsewhere herein), portions of thin devices, and the like. The wear rate may also be a measurement or level of "how busy" a device is, for example, in terms of write operations or PE cycles.

In one embodiment in accordance with techniques herein, components of FIG. 6, such as the performance monitoring software 134, performance data 136 and/or data storage optimizer 135, may be located and execute on a system or processor that is external to the data storage system. As an alternative or in addition to having one or more components execute on a processor, system or component external to the data storage system, one or more of the foregoing components may be located and execute on a processor of the data storage system itself.

It should be noted that the back-end (e.g., physical device) write operations with respect to a LUN, thin device, and the like, may be viewed as write requests or commands from the DA 23, controller or other backend physical device interface. Thus, these are operations may also be characterized as a number of operations with respect to the physical storage device (e.g., number of physical device writes based on physical device accesses). This is in contrast to observing or counting a number of particular type of I/O requests (e.g., reads or writes) as issued from the host and received by a front end component such as an HA 21. For example, when writing data of a received host I/O request to the physical device, the host write request may result in multiple reads and/or writes by the DA 23 in addition to writing out the host or user data of the request. If the data storage system implements a RAID data protection technique, such as RAID-5, additional reads and writes may be performed such as in connection with writing out additional parity information for the user data. Thus, observed data gathered to determine wear rate, such as observed numbers writes may refer to the write requests or commands performed by the DA. Such write commands may correspond, respectively, to physical device accesses such as disk writes that may result from a host I/O request received by an HA 21.

The optimizer 135 may perform processing to determine how to allocate or partition physical storage in a multi-tiered environment for use by multiple applications. The optimizer 135 may perform processing such as, for example, to determine what particular portions of LUNs, such as thin devices, to store on physical devices of a particular tier, evaluate when to move data between physical drives of different pools, tiers, and the like. Such data portions of a thin device may be automatically placed in a storage pool. The data portions may also be automatically relocated or moved to a different storage pool as the SSD wear rate and observed performance characteristics for the data portions change over time. In accordance with techniques herein, analysis of wear rate for data portions of thin devices may be performed in order to determine whether particular data portions should have their data contents stored on physical devices located in a particular storage pool. It should be noted that the optimizer 135 may generally represent one or more components that perform processing as described herein as well as one or more other optimizations and other processing that may be performed in an embodiment.

Promotion may refer to movement of data from a source storage tier to a target storage tier where the target storage tier is characterized as having devices of higher performance than devices of the source storage tier. For example movement of data from a tier of 10K RPM drives to a tier of SSDs may be characterized as a promotion and may be performed when the SSD wear rate directed to the relocated data increases. Demotion may refer generally to movement of data from a source storage tier to a target storage tier where the source storage tier is characterized as having devices of higher performance than devices of the target storage tier. For example movement of data from a tier of SSDs to a tier of 10K RPM drives may be characterized as a demotion and may be performed when the SSD wear rate directed to the relocated data decreases.

An embodiment may use a data storage optimizer such as, for example, EMC® Fully Automated Storage and Tiering for Virtual Pools (FAST VP) by EMC Corporation, providing functionality as described herein for such automated evaluation and data movement optimizations. For example, different techniques that may be used in connection with the data storage optimizer are described in U.S. patent application Ser. No. 13/466,775, filed May 8, 2012, PERFORMING DATA STORAGE OPTIMIZATIONS ACROSS MULTIPLE DATA STORAGE SYSTEMS, which is incorporated by reference herein.

In at least one embodiment in accordance with techniques herein, one or more I/O statistics may be observed and collected for individual partitions, or slices of each LUN, such as each thin or virtually provisioned LUN. The logical address space of each LUN may be divided into partitions each of which corresponds to a subrange of the LUN's logical address space. Thus, I/O statistics may be maintained for individual partitions or slices of each LUN where each such partition or slice is of a particular size and maps to a corresponding subrange of the LUN's logical address space.

An embodiment may have different size granularities or units. For example, consider a case for a thin LUN having a first logical address space where I/O statistics may be maintained for a first slice having a corresponding logical address subrange of the first logical address space.

The embodiment may allocate physical storage for thin LUNs in allocation units referred to as chunks. In some cases, there may be multiple chunks in a single slice (e.g. where each chunk may be less than the size of a slice for which I/O statistics are maintained). Thus, the entire corresponding logical address subrange of the first slice may not be mapped to allocated physical storage depending on what logical addresses of the thin LUN have been written to. Additionally, the embodiment may perform data movement or relocation optimizations based on a data movement size granularity. In at least one embodiment, the data movement size granularity or unit may be the same as the size of a slice for which I/O statistics are maintained and collected.

In at least one embodiment of a data storage system using techniques described herein, a fixed size slice may be used for each LUN's logical address space. For example, the size of each slice may be 256 megabytes (MB) thereby denoting that I/O statistics are collected for each 256 MB portion of logical address space and where data movement optimizations are performed which relocate or move data portions which are 256 MB in size. In such an embodiment, data may be allocated for thin devices in chunks where, generally, the size of a slice is some integer multiple of a chunk (e.g., there may be one or multiple chunks in a single slice). In at least one embodiment, storage may be allocated for thin devices in chunks which are each 256 MB or the same size as a slice whereby the size granularity for data movement, thin device allocation and statistics collection may be the same.

In one embodiment, I/O statistics or metrics maintained for slices, or more generally, data portions, of a LUN may reflect I/O activity or SSD wear rate expressed, for example, write operation per hour and wear ratio (as will be further explained below). It should be noted that more generally, any suitable I/O statistic may be used to measure the SSD wear rate of data portions to select which data portions belong on which SSD.

In one embodiment in accordance with techniques herein, the data storage optimizer may collect information regarding SSD wear rate of data portions for one or more time periods and use such information in connection with predicting and modeling SSD wear rate of the data portions for the next time period. Based on predicted SSD wear rates for the data portions, for example, for a next time period N+1, the data storage optimizer may select data portions for placement or movement to different SSDs. The data storage system may model the movement or placement of the data portions for the next time period N+1 using the predicted SSD wear rates for the data portions in order to determine, for example, overall data storage system performance, per storage tier performance, and the like. Based on such modeled or simulated performance of the data storage system, storage pools or tiers, and the like, if a selected set of data portion movements were performed, a decision may be made as to whether to actually implement or perform the modeled data movements or otherwise consider an alternative set of data movements.

Figure 7:
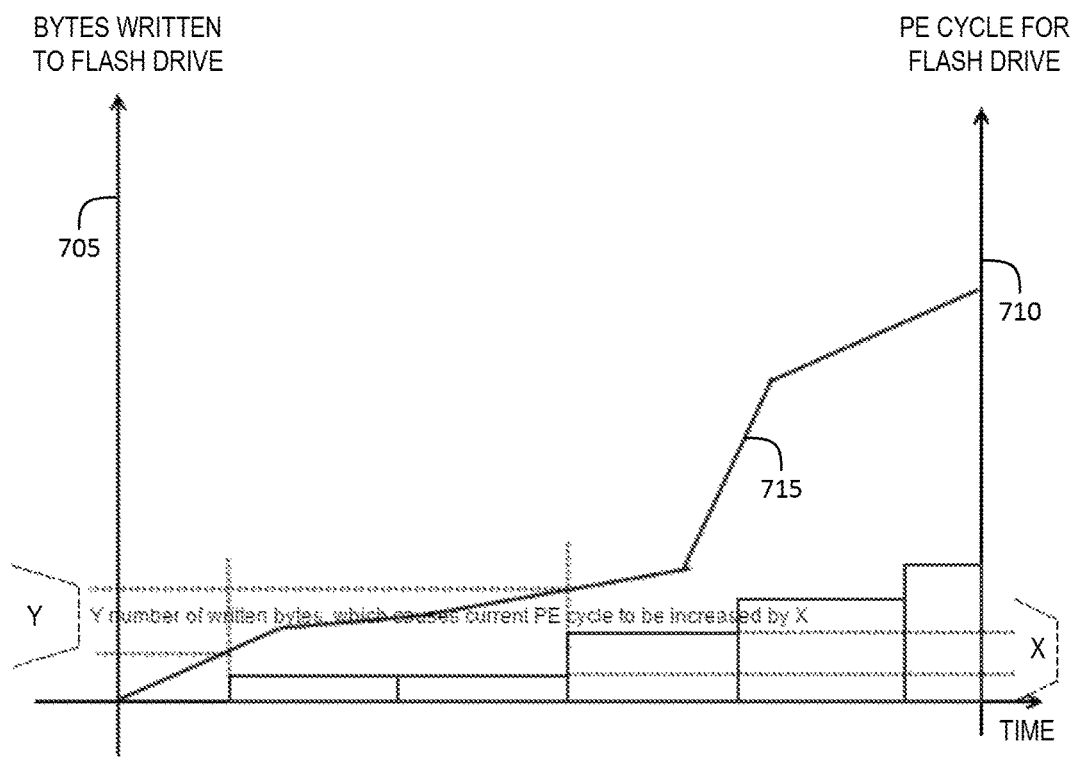
FIGS. 7 and 8 are graphical representations illustrating example embodiments that may utilize the techniques described herein.

FIG. 7 depicts a graphical representation illustrating SSD wear data collection and analysis techniques according to an example embodiment. With reference to logical address space corresponding to a particular slice, slice statistics may be generated for each slice that include, but not limited to, number of IOPs, number of blocks written. Flash drive statistics may also be generated for each SSD that includes the drive's maximum PE cycle count, current PE cycle count, and hours to end of warranty (EOW).

The left Y axis 705 represents the number of bytes or blocks written to a SSD. This may be determined by summing the slice statistics for all or substantially all the slices stored on a particular SSD. Thus, the sum of the bytes written to each slice may represent the number of bytes written to the corresponding SSD. The right Y axis 710 represents the number of current PE cycles for the SSD. The current PE cycle, max PE cycle, and hours to EOW may be determined by querying the SSD of interest and/or a corresponding data structure maintained by storage system. The X axis represents time over which the bytes are written and PE cycles occur. When the graph is viewed as a whole, the activity line 715 represents the Y 705 number of bytes written to the SSD that causes the current PE cycle to increase by X, that is, how many bytes causes the PE cycle count to increase. Put another way, as Y 705 number of bytes causes X 710 change in cycle count, then Y/X bytes written causes the PE cycle to increase by 1.

Given that an SSD has a max PE cycle count and that we can determine the current PE count, the remaining number of PE cycles to EOW can be calculated by subtracting the current PE cycle count from the max PE cycle count. With this information and calculating Y/X as described above, the number of bytes that can be written to the SSD before the SSD reaches EOW can be calculated as follows:

$$\text{Bytes written to EOW} = (\text{Max } PE - \text{Current } PE) * (Y/X) \quad \text{EQUATION 1}$$

SSDs can be rated as having a number of writes per hour to EOW. For example, a SSD may be specified as being able to perform 3 writes per hour for a period of 5 years. If we know that a drive has W hours to EOW, the number of bytes per hour that can be written to the SSD before it reaches EOW may be calculated as follows:

$$Q = (\text{Max } PE - \text{Current } PE) * (Y/X) * W; \quad \text{EQUATION 2}$$

Where Q=bytes written per hour to reach EOW, and W is number of hours until EOW

Thus, if Q bytes are written per hour, the drive will not wear out before the EOW period.

Figure 8:
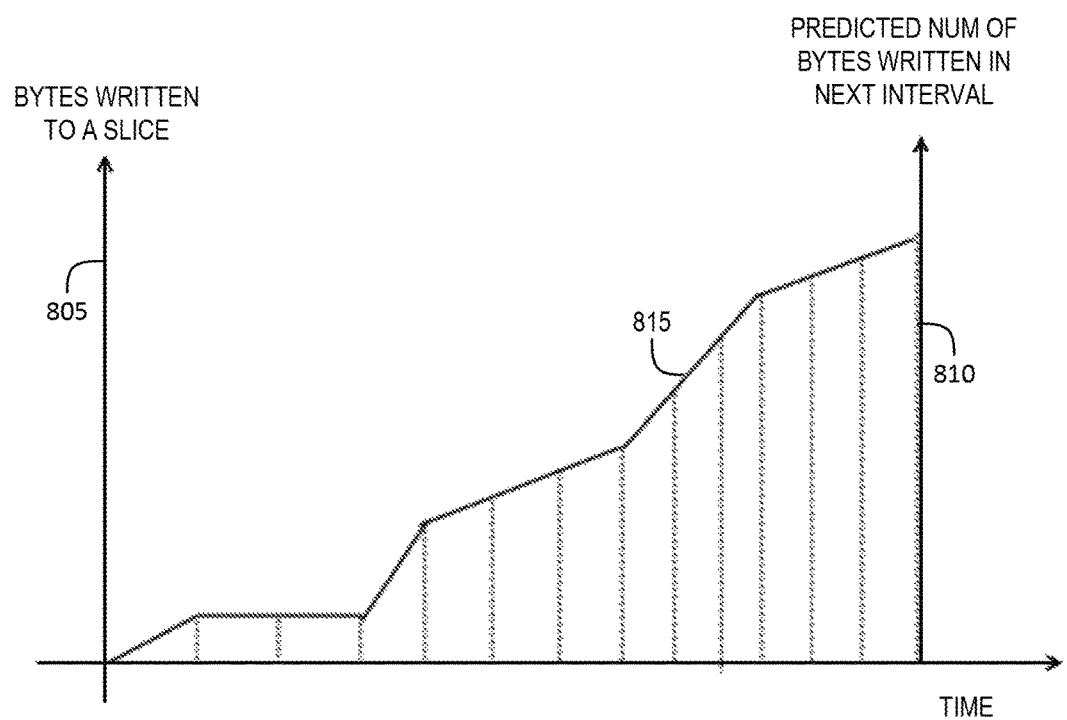

FIG. 8 is a graphical representation illustrating an example embodiment employing the techniques described herein. The left Y axis 805 represents the number of bytes written to a particular slice. The right Y axis 810 represents a predicted number of bytes that will be written in the next time interval, the time axis is segmented according to the time intervals.

Data storage systems employing data movement methods such as the FAST methods described elsewhere herein, slice data typically exhibits special and temporal locality access characteristics that enable predicting the number of bytes that will be written to a particular slice in a next time interval based on previous write activity. As described above, slice statistics are determined for each slice stored on the data storage system and these statistics can be used to estimate the number of bytes that will be written to the slice during the next time interval. For example, in one example embodiment, the predicted number of bytes written to a slice in the next time interval may be estimated performing an linear or similar extrapolation of bytes written during a number of previous time intervals. In another example embodiment, a linear or similar extrapolation may be performed. In another embodiment, a moving average using n samples as a history may be used. In another example embodiment, simply the number of bytes written in the previous time interval may be used, where the smaller the time interval, the closer the estimate will track the actual number of bytes written. Other estimation methods may be similarly implemented.

Using the techniques described above for analyzing slice and drive information, the estimated number of bytes to be written to a SSD can be determined. For example, for a particular SSD, the slices stored on the SSD can be determined. The number of the estimated writes for all the slices stored on the SSD can be calculated to determine the of estimated writes for the SSD. With this information, a ratio representing SSD wear rate may be determined using the following:

$$\text{Wear rate} = \text{Sum}WR/Q \qquad \text{EQUATION 3}$$

where SumWR is the estimated number of writes for a SSD and Q is determined using EQUATION 2 as described above. Accordingly, increasing SumWR increases the ratio value, representing an increased wear rate; conversely decreasing SumWR decrease the ratio value, representing a decrease wear rate. Thus, determining slice statistics and analyzing drive parameters provides the ability to determine a SSD's wear rate. Executing the technique for a set of SSDs enables identifying SSDs that may wear out before a specified warranty period. The technique further provided a mechanism to identify slices on such drives and move one or more slices to drives having lower wear rates so as to balance wear across a set of drives or substantially all the drives in a storage system.

Figure 9:
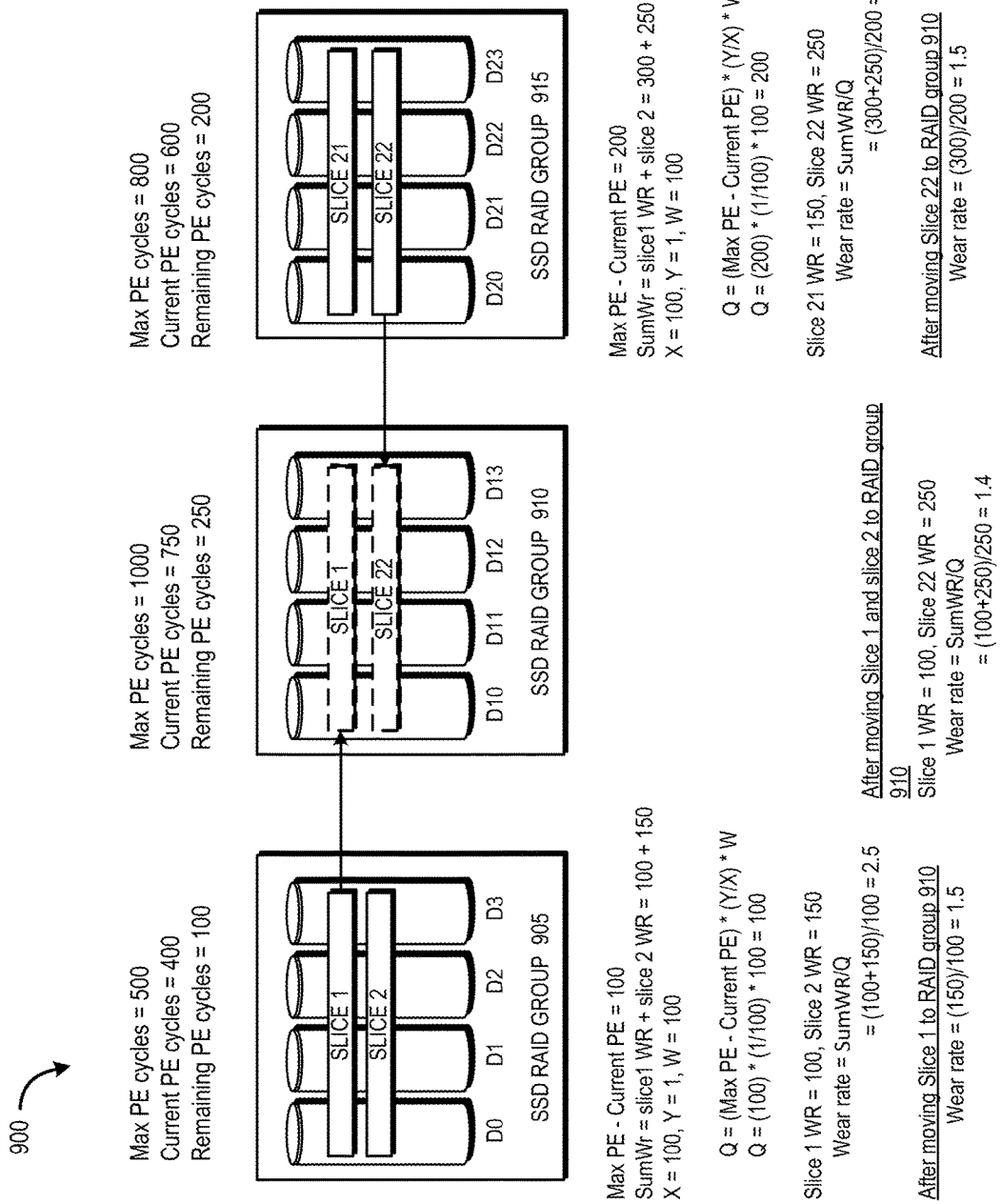
FIG. 9 is an example of a system that may utilize the technique described herein.

FIG. 9 illustrates an example embodiment 900 of a data storage system implementing the techniques described herein. Shown are a plurality of flash drives arranged into three SSD RAID group configurations where SSD RAID group 905 includes flash drives D0-D3, SSD RAID group 910 includes flash drives D10-D13, and SSD RAID group 915 includes flash drives D20-D23. Initially, RAID group 905 has slices 1-2 stored thereon, and RAID group 915 has slices 21-22 stored on it and RAID group 910 is empty (e.g., just installed). Although the technique is shown as applied to RAID groups, the technique can be applied to as few as one flash drive to essentially an entire storage array.

RAID group 905 has a max PE cycle specification of 500, where the current PE cycle count=400 and, therefore, the remaining PE cycle count=100. X=100, which represents, the number of bytes that causes Y, the PE count, to increase by 1. Thus, Y/X=1/100=0.01. W, the number of time intervals at which the EOW is reached=100. Consequently, applying EQUATION 2 as discussed above, Q=(Remaining PE count)*(Y/X)*W=(100)*(0.01)*100=100. After analyzing drive statistics, the technique turns to the slices stored on the RAID group 905 flash drives. WR represents the estimated number of bytes that will be written to a particular slice. Here, slice 1 has a WR=100 and slice 2 has a WR=150. Applying EQUATION 3, the wear rate ratio for RAID group 905=SumWR/Q=(100+150)/100=2.5. At this rate, the flash drives will wear out before the EOW is reached.

The technique is applied to the next RAID group in a similar manner. For example, RAID group 915 has a max PE cycle specification of 800, where the current PE cycle count=600 and, therefore, the remaining PE cycle count=200. X=100, which represents, the number of bytes that causes Y, the PE count, to increase by 1. Thus, Y/X=1/100=0.01. W, the number of time intervals at which the EOW is reached=100. Consequently, applying EQUATION 2 as discussed above, Q=(Remaining PE count)*(Y/X)*W=(200)*(0.01)*100=200. After analyzing drive statistics, the technique turns to the slices stored on the RAID group 915 flash drives. WR represents the estimated number of bytes that will be written to a particular slice. Here, slice 21 has a WR=150 and slice 2 has a WR=250. Applying EQUATION 3, the wear rate ratio for RAID group 915=SumWR/Q=(300+250)/200=2.75. At this rate, the flash drives of RAID group 915 will also wear out before the EOW is reached.

RAID group 910 is a group of flash drives that have a very low wear rate (e.g., a newly installed or newly provisioned RAID group). The technique may the implemented in a similar manner to determine that the wear rate ratio is close to zero. To balance wear across all the flash drives evenly, the technique moves one or more slices to adjust the wear rate so that drives experiencing a high wear rate is reduced and moved to drives experience a low wear rate. In this example, slice 1 is moved from RAID group 905 to RAID group 910 and slice 22 is moved from RAID group 915 to RAID group 910.

Figure 10:
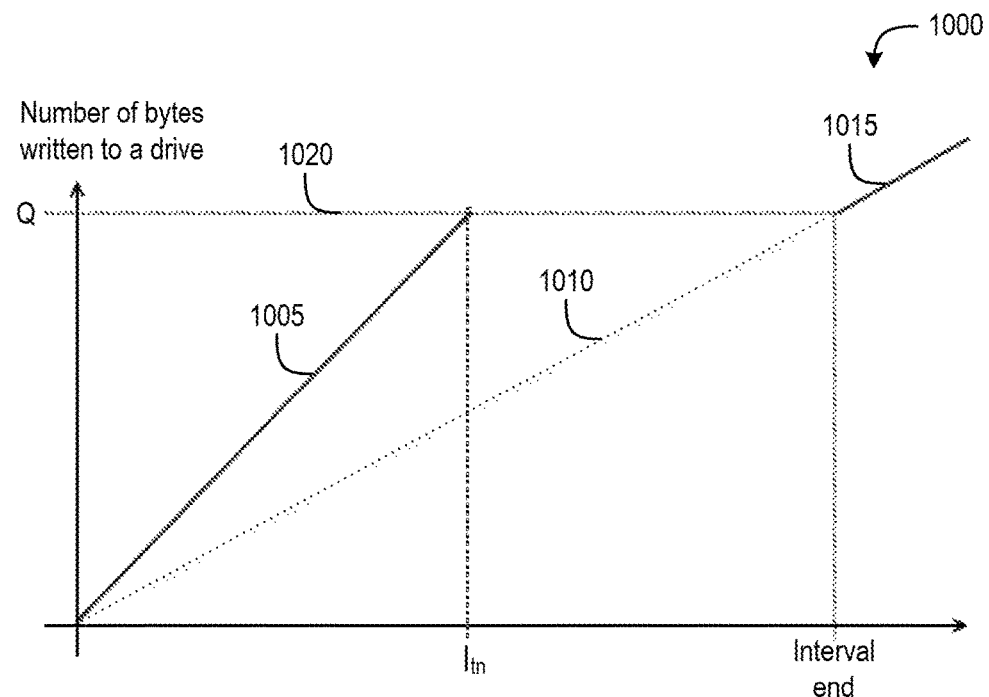
FIG. 10 is a graphical representations illustrating example embodiments that may utilize the techniques described herein.
Figure 10:
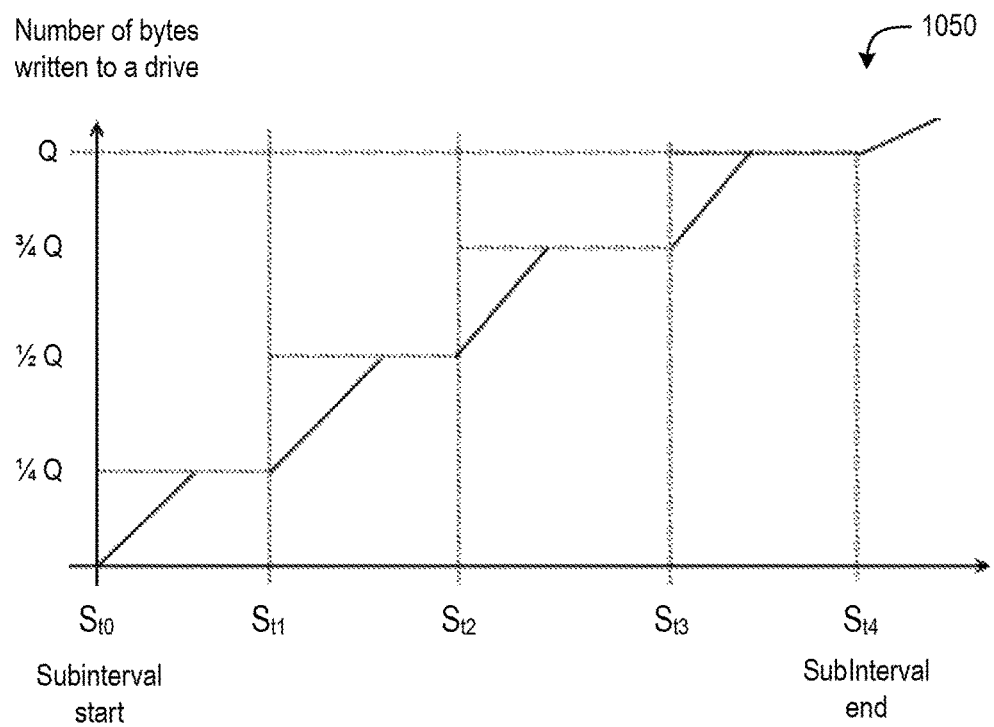

FIG. 10 depicts a graphical representations 1000, 1050 illustrating techniques for creating, implementing and managing write quotas for SSDs. The Y axis represents the number of bytes written to a drive (Q) vs. an interval period in units of time for a particular interval period. Q represents an SSD write quota and may be determined in a manner similar to that as was described elsewhere herein including with reference to FIG. 9. The slope of line 1005 represents the rate at which write operations are performed by the SSD. Thus, a steeper slope indicates a higher wear rate whereas a shallower slope indicates a lower wear rate.

In one example embodiment, graph 1000 illustrates SSD write operations according to time. SSD provide significant performance improvements as compared with HDD, therefore, in this example, the goal is to maximize use of the SSD. However, as was discussed elsewhere herein, SSD have a limited number of write operations before they are considered "worn out" after which point, they may begin to become unreliable. To address concerns surrounding premature wear out, storage array providers warranty the life SSDs, for example, 5 years during which time, any SSD failures will be replaced. The design criteria assumes a certain number of writes will occur during the warranty period. However, in certain extreme cases, it is possible for an SSD to service an number of writes that exceeds the drives max PE cycle count before the end of the warranty (EOW) period, thereby increasing warranty costs to the storage array manufacturer. In addition, cost reduction efforts may include the use of less costly low endurance (LE) flash drives; however such drives typically have lower max PE cycle counts. As a result, the less costly drives will wear out earlier than high endurance (HE) drives.

The example embodiment provides a mechanism to identify SSDs that are experiencing high wear rates such that if such wear continues, the SSD will likely wear out before the end of the warranty period. Referring to graph 1000, line 1010 depicts a wear rate plot for an SSD that will result in a drive performing max PE cycle operations just as the end of warranty period is reached. Thus, if the number of bytes written to the SSD is such that Q equals max PE count occurs at some "Interval end" (e.g., the end of warranty period), the corresponding SSD will not likely wear out before the end of warranty. However, if, as depicted by line 1005, the SSD is performing a significantly higher number of write operations, Q number of PE cycle counts will occur at some time Itn—well before Interval end (i.e., EOW). In other words, max PE cycle count will occur before the EOW.

To prevent such an occurrence, one example embodiment employs a technique to track the number of bytes written to an SSD in a manner as was described with reference to FIG. 7. If the number of bytes written to the SSD causes the current PE cycle count to reach a particular value or threshold (e.g., Q), the technique will block subsequent writes to the SSD for the remainder of the interval period (i.e., interval end is reached). As a result, the SSD experience no additional wear for the remainder of the interval period. After the interval end point is reached, write blocking is turned off and write operations begin again in the usual manner as shown by line 1015. In this way, the technique allows control of SSD wear rate such that it can be assured that one, multiple or essentially all SSDs in a storage array will not exceed their specified wear rate (i.e., exceed max PE cycle count) before the end of a warranty period (or any other particular time interval). Example intervals may occur during standard storage array event processing times such as, for example, weekly, monthly, or the like.

In another example embodiment, the technique can be modified to provide additional resolution such that the blocking mechanism can be adjusted by subdividing the interval period and corresponding number of bytes threshold valued to provide a custom interval. A unique interval may be used, a unique interval may be subdivided, and/or alternatively, a standard storage array event interval may be subdivided. The Y axis of graph 1050 similarly represents the number of bytes written to a drive that cause PE cycle count to increment to a particular value (Q). For example, Q may be divided in fourths and subinterval may be divided into corresponding intervals. As an SSD executes write operations, the wear rate is determined.

If a wear rate representative of ¼ Q is reached during subinterval St0-St1, subsequent writes are blocked for the remainder of that subinterval. Upon reaching subinterval St1, write operations are no longer blocked and the SSD resumes performing write operations. If a wear rate representative of ½ Q is reached during subinterval St1-St2, subsequent writes are blocked for the remainder of that subinterval. Upon reaching subinterval St2, write operations are no longer blocked and the SSD resumes performing write operations. If a wear rate representative of ¾ Q is reached during subinterval St2-St3, subsequent writes are blocked for the remainder of that subinterval. Upon reaching subinterval St3, write operations are no longer blocked and the SSD resumes performing write operations. If a wear rate representative of Q is reached during subinterval St3-St4, subsequent writes are blocked for the remainder of that subinterval. Upon reaching subinterval St4, write operations are no longer blocked and the SSD resumes performing write operations. The cycle then repeats itself.

Alternative example embodiments may perform one, multiple or continuous subinterval cycles. Subinterval embodiments may be performed on demand by a user or system software, periodically, aperiodically or other such frequency. Other example embodiments include inserting delays (e.g., in the write queue) when Q reaches a particular threshold. Alternatively, or in addition, the predicted wear rate (and/or the actual measured wear rate) is tracked and interpolated. If the predicted (and/or actual) wear rate slope increases a predetermined amount above an ideal slope or rate (e.g., t\he slope of line 1010), delays are added to the write operations (e.g., queue delays). The actual wear rate slope may continue to be tracked and compared to the ideal slope and the number and/or amount of delays can be adjusted in order to control the current wear rate so as to ensure the SSD does not exceed the SSD's max PE cycle count before the interval end (e.g., the end of warranty period).

Figure 11:
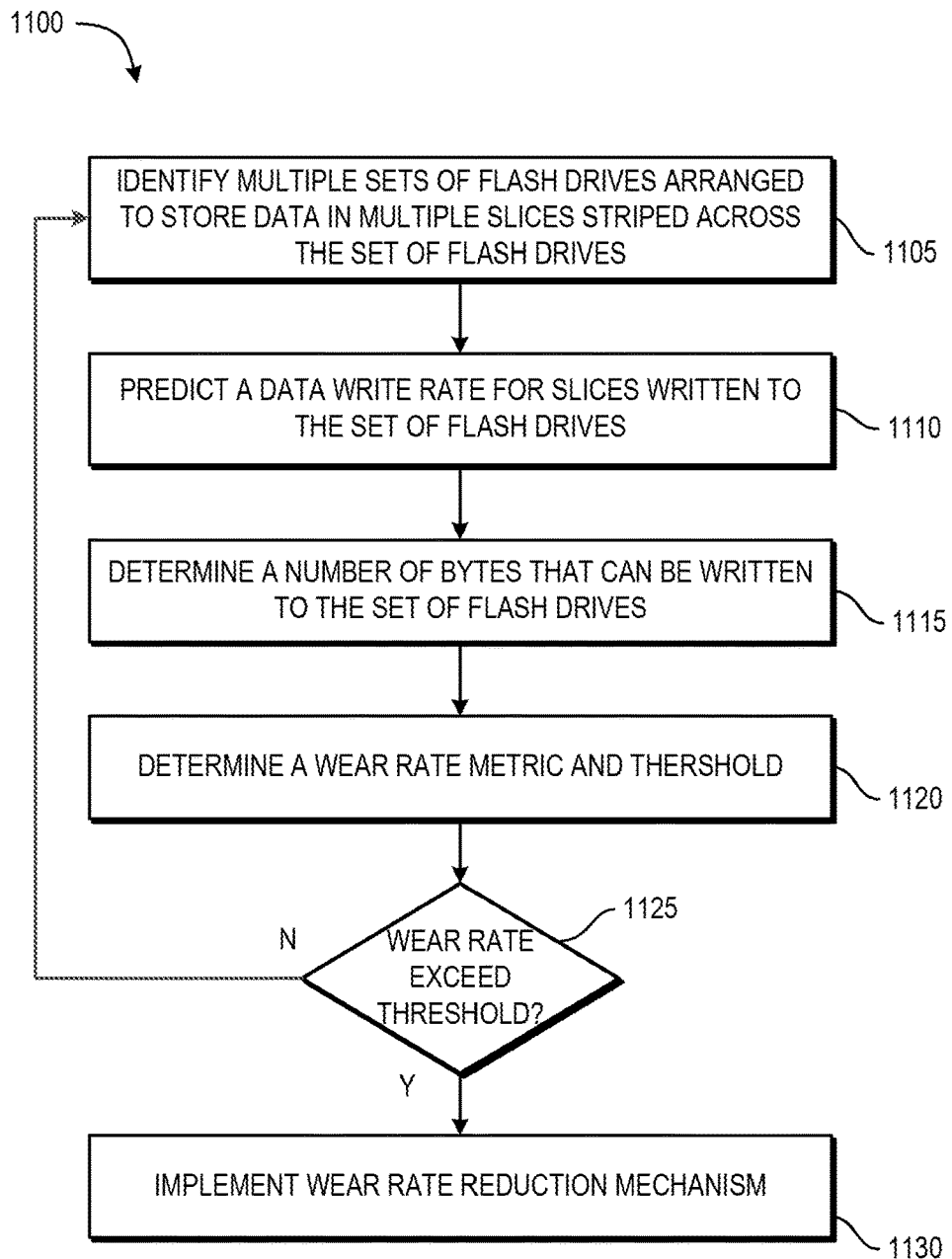
FIG. 11 is a flowchart of the technique performed in accordance with techniques described herein.

FIG. 11 depicts a flow diagram illustrating example embodiments of a method 1100 according to various implementations for use in managing SSD write quotas in data storage systems. While various methods disclosed herein are shown in relation to a flowchart or flowcharts, it should be noted that any ordering of method steps implied by such flowcharts or the description thereof is not to be construed as limiting the method to performing the steps, or sub-steps within or among the steps, in that order. Rather, the various steps of each of the methods disclosed herein can be performed in any of a variety of sequences. In addition, as the illustrated flowcharts are merely example embodiments, various other methods that include additional steps or include fewer steps than illustrated are also within the scope of the present invention. The operations may be performed in hardware, or as processor-executable instructions that may be executed by a processor. Furthermore, the method 1100 may, but need not necessarily, be implemented using the data storage system of FIG. 1 and may also be implemented, in or in combination with, for example, a server, storage appliance, network device, cloud storage system, virtualization appliance, software defined storage, or other such implementation comprising or exercising flash based SSDs. The SSDs may be constructed using different types of memory technologies such as nonvolatile semiconductor NAND flash memory forming one or more SLC devices and/or MLC devices. The SSDs may be arranged in a RAID configuration in one or more data storage systems. Alternatively, or in addition, flash drives may be configured as a storage tier in the data storage system, wherein the storage tier is one of multiple storage tiers, the multiple storage tiers having progressively better response time characteristics.

Referring to FIG. 11, with reference to the systems of FIGS. 1 and 9, and the graphs of FIG. 10, the method provides a mechanism to, for example, identify the wear rate of an SSD or flash drive and assign a write quota for the SSD. When data is arranged, for example, as a slice stored on a LUN, the slices are mapped to physical drives using a mapping layer. The data may be stored such that a first RAID group(s) stores slices that are write heavy while a second RAID group(s) stores less write heavy and/or read heavy data slices. In such a case, the first RAID group will experience a wear rate significantly higher than the second RAID group. Since SSD flash drives have a limited write capability, the first RAID group may fail earlier than desired. For example, a storage array comprising SSD flash drives may have a 5 year warranty period. The array may be designed such that an SSD flash drive engineered perform a certain number of write operations over the 5 year warranty, and under normal operations, such warranty periods are sufficiently satisfied. However, extreme wear patterns such as those described above may cause an SSD to wear faster that the systems design parameters resulting in a failure that is subject to a warranty claim.

The example embodiments depicted in FIG. 11 provide a mechanism to predict (or measure actual) the wear rate of multiple SSDs, determine a write quota for the SSDs, and if the predicted wear rate is such that, if it continues, the SSD will wear out before the end of a particular interval (e.g., the end of a warranty period), the technique adjust write operations to reduce the wear rate so as to ensure the drives will not wear out (e.g., not exceed max PE cycle count) before the end of the warranty period. It should be noted that although the techniques discuss SSDs in relation to a data storage system in various example embodiments, the techniques may be used in other systems having SSDs where the write commands may be sent to, for example, a server, purpose built storage appliances, converged infrastructure systems or virtualized storage, where the flash wear reduction and performance improvements techniques may be similarly applied.

At step 1105, the method identifies multiple sets of flash drives, where each set of flash drives are arranged to store multiple slices of data where the slices are striped across a group of SSD in, for example, a RAID configuration. Although the technique is described using RAID configuration, various alternative embodiments may implement other various configurations and arrangements.

At step 1110, the method predicts a write rate for each set of flash drives. That is, for each slice stored on the set of flash drives, the rate as which data will be written to the flash drive in the next time interval will be predicted. In one embodiment, the pervious actual data write rate will be used. In the case where the time intervals are relatively short, as a result of temporal and special locality, the predicted write rates will be fairly accurate as they will predictably lag the actual rate in an acceptable manner. In other various example embodiments, the rate may be determined by performing a moving average averaging n previous recorded write rates, performing a linear fit or similar such extrapolation. The predicted number of expected writes may be referred to as WR. Slice and drive information may be analyzed such that WR can be determined for each slice on an SSD RAID group. The sum of the expected writes for all the slices stored on RAID group's SSD flash drives may be referred to as SumWR.

At step 1115, the number of remaining PE cycles (i.e., number of remaining write operations) that can be performed by SSD RAID group flash drives may be determined. For example, if a RAID group has a max PE cycle count of 500, and its current PC cycle count is 400, there are 110 remaining PE cycles before the drive is at the end of its specified PE cycle count and considered "worn out." While the drive may not fail immediately, the drive cannot be expected to reliably store data from that point forward.

At step 1120, a metric representative of a wear rate may be determined for each flash drive in the RAID group and/or for the RAID group as a whole in a manner as was discussed in FIG. 9. In addition, a write quota may be determined and is associated with the number of bytes written to the RAID group. For example, Q or a variation of Q such as the bytes per hour written to the RAID group may be used. This value may be used as a threshold value that is applied to the predicted (or actual) SSD write or wear rate.

In one example embodiment, the wear metric may be expressed as a ratio SumWR (the sum of the expected writes to slices on the RAID group) and quota Q (e.g., the number of bytes/hour written to the RAID group before reaches a quota such as when the RAID group remaining PE cycle count=0). Other metrics using the parameters discussed above may be implemented in a similar manner. For example, referring FIG. 10, a quota can be determined to correspond to a value shown by line 1020. An excessive or accelerated wear rate may be triggered when the wear rate of the RAID group (depicted by the slope of line 1005) exceeds a predetermined quota value.

At step 1125, a determination is executed to determine if the RAID group's wear rate exceeds a predetermined threshold in a manner similar to that as described with reference to FIG. 10. If no, the method may, but need not, return to step 1105 and repeat the method. If yes, the method proceeds to step 1130.

At step 1130, the method implements a wear rate reduction mechanism in order to slow or stop the wear rates across one or more RAID groups such that the RAID group flash SSDs do not reach a wear out state (e.g., max PE cycle count=0) before the end of a particular interval period (e.g., the end of warranty period or some amount of time thereafter). In one example embodiment, wear reduction mechanisms include blocking write to one or more RAID groups when write rate exceeds a metric representative of wear rate. Another example embodiment includes subdividing the interval period and quota value and blocking write operations when subdivided wear rated exceeds the subdivided wear rate. In another example embodiment, delays may be inserted in a queue once the number of bytes written exceeds a particular rate, such as an ideal consumption rate (e.g., the rate represented by line 1010 in FIG. 10). Other example embodiments may implement general multidimensional knapsack approach, greedy algorithm, and the like.

While the above description refers to a data storage system or array having flash based SSD, the techniques may be similarly applied according to alternative embodiments directed to other systems implementing flash based SSDs such as servers, network processors, compute blocks, converged systems, virtualized systems, and the like. Additionally, it should be appreciated that the technique can apply to block, file, object and/or content architectures.

It will be appreciated that an embodiment may implement the technique herein using code executed by a computer processor. For example, an embodiment may implement the technique herein using code which is executed by a processor of the data storage system. As will be appreciated by those skilled in the art, the code may be stored on the data storage system on any one of a computer-readable medium having any one of a variety of different forms including volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by a data storage system processor.

While various embodiments of the present disclosure have been particularly shown and described, it will be understood by those skilled in the art that various changes in form and details may be made therein without departing from the spirit and scope of the present disclosure as defined by the appended claims.

What is claimed is:

1. A method for use in managing flash drive write quotas in data storage systems, the method comprising:
    identifying multiple sets of flash drives, wherein each set of flash drives store data arranged in multiple slices striped across the set of flash drives;
    predicting, for each set of flash drives, a write rate at which data will be written to the multiple slices stored on the set of flash drives during a next time interval;
    determining, for each set of flash drives, a number of bytes that can be written to each set of flash drives, wherein the number is based on one or more program/erase (PE) cycle count values for each respective set of flash drives;
    determining, for each set of flash drives, a metric representative of a wear rate, the metric based on a respective flash drive's determined predicted write rate and the determined number of bytes that can be written to each set of flash drives;
determining a write quota threshold and a time interval for each set of flash drives; and
if the metric exceeds the write quota for one or more sets of flash drives during the time interval, reducing the wear rate for the one or more sets of flash drives.

2. The method as claimed in claim 1, wherein reducing the wear rate includes blocking subsequent write operations to the one or more flash drives during the time interval.

3. The method as claimed in claim 1, wherein reducing the wear rate further includes dividing the write quota threshold into multiple sub-thresholds and dividing the time interval into a corresponding number of sub-intervals.

4. The method as claimed in claim 1, wherein reducing the wear rate includes inserting delays to reduce subsequent write times for writes operations directed to the one or more sets of flash drives.

5. The method as claimed in claim 1, wherein predicting the write rate includes identifying one or more actual write rates occurring during one or more corresponding time intervals occurring substantially immediately prior to the next time interval, wherein the predicted write rate is a function of the identified one or more actual write rates.

6. A system for use in managing flash drive write quotas in data storage systems, the system comprising:
a storage processor and memory configured to:
identify multiple sets of flash drives, wherein each set of flash drives store data arranged in multiple slices striped across the set of flash drives;
predict, for each set of flash drives, a write rate at which data will be written to the multiple slices stored on the set of flash drives during a next time interval;
determine, for each set of flash drives, a number of bytes that can be written to each set of flash drives, wherein the number is based on a remaining program/erase (PE) cycle count for each respective set of flash drives;
determine, for each set of flash drives, a metric representative of a wear rate, the metric based on a respective flash drive's determined predicted write rate and the determined number of bytes that can be written to each set of flash drives;
determine a write quota threshold and a time interval for each set of flash drives; and
if the metric exceeds the write quota for one or more sets of flash drives during the time interval, reduce the wear rate for the one or more sets of flash drives.

7. A computer-program product including a non-transitory computer-readable storage medium encoded with computer-program code that, when executed on a processor of a computer, causes the computer to manage data storage in a data storage system, the computer-program product further comprising:
identifying multiple sets of flash drives, wherein each set of flash drives store data arranged in multiple slices striped across the set of flash drives;
predicting, for each set of flash drives, a write rate at which data will be written to the multiple slices stored on the set of flash drives during a next time interval;
determining, for each set of flash drives, a number of bytes that can be written to each set of flash drives, wherein the number is based on one or more program/erase (PE) cycle count values for each respective set of flash drives;
determining, for each set of flash drives, a metric representative of a wear rate, the metric based on a respective flash drive's determined predicted write rate and the determined number of bytes that can be written to each set of flash drives;
determining a write quota threshold and a time interval for each set of flash drives; and
if the metric exceeds the write quota for one or more sets of flash drives during the time interval, reducing the wear rate for the one or more sets of flash drives.

* * * * *